March 25, 1958  F. A. BAKER ET AL  2,828,463
VOLTAGE REFERENCE DEVICE
Filed Aug. 19, 1954

WITNESSES
Edwin E. Bassler
R. H. Thomas

INVENTORS
Floyd A. Baker and
Benjamin C. McLeod.
BY
Gerald Savage
ATTORNEY

United States Patent Office 2,828,463
Patented Mar. 25, 1958

2,828,463

VOLTAGE REFERENCE DEVICE

Floyd A. Baker, Baltimore, and Benjamin C. McLeod, Catonsville, Md., assignors to Westinghouse Electric Corporation, East Pittsburgh, Pa., a corporation of Pennsylvania Application August 19, 1954, Serial No. 450,930

2 Claims. (Cl. 323—61)

This invention relates to voltage reference devices and in particular to such devices employing static components.

In regulating and control systems the quantity to be controlled is often compared to a reference quantity. The difference or error signal is used to actuate a correction system which tends to maintain the controlled quantity at a fixed value. The reference quantity may be some physical constant such as the modulus of elasticity of a spring, for example, the spring holding the carbon stack in a carbon pile regulator. In electrical systems the reference quantity can be a voltage or current. In a voltage regulator the line voltage can be compared to a reference voltage or current, and the error signal can be used to control the generator field in order to maintain the line voltage constant as the generator load is varied. If the input to the reference is supplied from the generator output or an auxiliary source, the reference output has to remain constant as the magnitude of the input voltage varies.

Many types of electronic voltage reference devices have heretofore been utilized, however, such electronic devices have several disadvantages. For instance, the component parts of such electronic devices have to be replaced periodically, thus interrupting service furnished by other apparatus associated therewith. In addition, the original cost of electronic voltage reference devices is relatively high.

Various types of static voltage reference devices have also been utilized heretofore. For instance, a saturating transformer has been utilized in a voltage reference device in which the input voltage to the saturating transformer is always of sufficient amplitude to effect a saturation of the saturating transformer during each half cycle of operation. However, this prior art voltage reference device has disadvantages. For instance, any D. C. component of current on the secondary side of the saturating transformer may effect a saturation of the saturating transformer, thus nullifying its effect as a reference device.

An object of this invention is to provide for obtaining a substantially constant average output voltage from a static type reference device even though the amplitude of its input voltage varies, and even though a direct current component of current exists in the output circuit of the reference device.

Another object of this invention is to provide for applying substantially constant volt-seconds to an ordinary potential transformer, to thereby produce a substantially constant average output voltage from the transformer.

Other objects of this invention will become apparent from the following description when taken in conjunction with the accompanying drawing in which.

Figure 1:
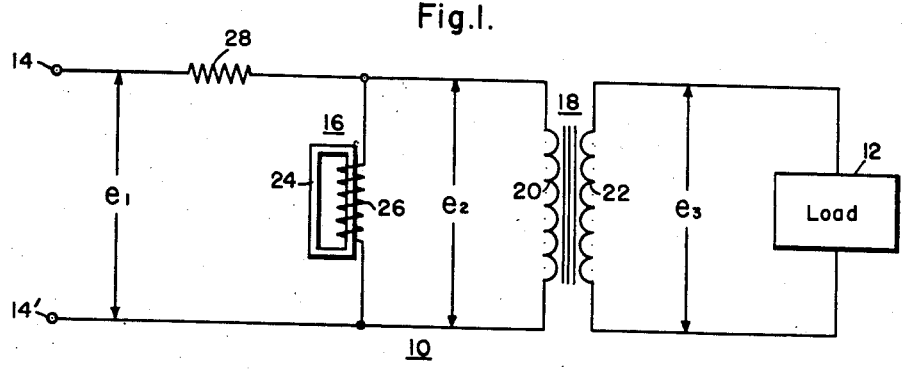
Figure 1 is a schematic diagram of apparatus and circuits illustrating this invention.

Referring to Fig. 1 there is illustrated a voltage reference device 10 which produces across a load 12 a substantially constant average output voltage even though the amplitude of the alternating current voltage as applied to input terminals 14 and 14' varies. In general, the voltage reference device 10 comprises a saturating reactor 16, and a potential transformer 18 having a primary winding 20 and a secondary winding 22.

In this instance, the saturating reactor 16 comprises a magnetic core member 24, preferably constructed of rectangular loop core material, and a reactor winding 26 disposed in inductive relationship therewith. In practice, the magnitude of the alternating current voltage, as applied to the terminals 14 and 14', is always of sufficient value as to effect a substantially complete magnetic saturation of the magnetic core member 24 during each half-cycle of the voltage applied to the terminals 14 and 14'.

In order to prevent a voltage of any appreciable value from being applied to the primary winding 20 of the potential transformer 18 while the magnetic core member 24 of the saturating reactor 16 is saturated, an impedance member, specifically a resistor 28, is connected in series circuit relationship with the reactor winding 26 of the saturating reactor 16. Thus, when a substantially complete saturation of the magnetic core member 24 is effected, the input voltage as applied to the terminals 14 and 14' is dropped across the resistor 28. The resistor 26 also functions to limit the current flow through the reactor winding 26 of the saturating reactor 16 while its magnetic core member 24 is saturated, thereby preventing damage to the reactor winding 26.

Figure 2:
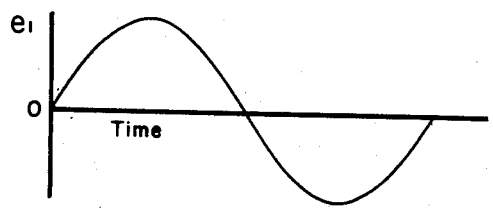
Fig. 2 illustrates the wave form of the input voltage to the voltage reference device illustrated in Fig. 1.
Figure 3:
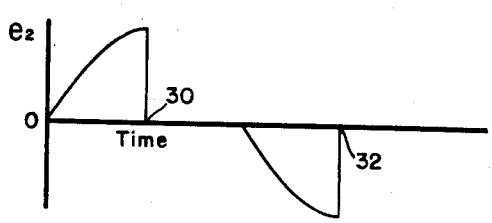
Fig. 3 illustrates a wave form for the voltage appearing on the output side of the saturating reactor illustrated in Fig. 1.

For the purpose of energizing the reactor winding 26 of the saturating reactor 16 in accordance with the input voltage, as applied to the terminals 14 and 14', the series circuit including the resistor 28 and the reactor winding 26 is connected to the input terminals 14 and 14'. As hereinbefore mentioned, the wave shape of the voltage applied to the terminals 14 and 14' is as illustrated in Fig. 2. However, once the magnetic core member 24 of the saturating reactor 16 saturates in the positive direction during one half-cycle of the operation, the voltage $e_2$ appearing across the reactor winding 26 decreases to substantially zero magnitude as illustrated at 30. The voltage $e_1$ then appears across the resistor 28 during the remaining portion of the half-cycle of operation. Then, as illustrated in Fig. 3, during the next half-cycle of operation when the magnetic core member 24 is being driven to negative saturation, a voltage again appears across the reactor winding 26 while the magnetic core member 24 is in the unsaturated state. However, once the magnetic core member 24 of the saturating reactor 16 saturates in the negative direction, the voltage $e_2$ decreases to zero magnitude as illustrated at 32.

Figure 4:
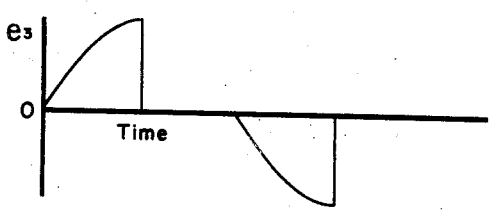
Fig. 4 illustrates the wave form of the voltage appearing on the output side of the potential transformer illustrated in Fig. 1 when the voltage appearing on the output side of the saturating reactor is as illustrated in Fig. 3.

In order to apply the voltage $e_2$, and thus constant volt-seconds, to the primary winding 20 of the potential transformer 18, the reactor winding 26 is connected in parallel circuit relationship with the primary winding 20. Thus, if it is assumed that the potential transformer 18 has a one to one ratio, the voltage $e_3$, as it appears on the output side of the transformer 18, is of the same magnitude and wave shape as the voltage $e_2$. This can more clearly be seen from the wave forms of Figs. 3 and 4. In this instance, the voltage $e_3$ is applied to the load 12, the load 12 being connected in parallel circuit relationship with the secondary winding 22 of the potential transformer 18.

In operation, the average of the voltage $e_3$ or the average voltage appearing across the load 12 remains substantially constant. The reason that the average of the voltage $e_3$ remains substantially constant is that substantially constant volt-seconds are applied to the potential transformer 18. This is accomplished by means of the saturating reactor 16 whose magnetic core member 24 saturates during each half-cycle of the alternating voltage applied to the terminals 14 and 14'. This can be better understood by considering that it takes a predetermined number of volt-seconds to saturate the magnetic core member 24 of the saturating reactor 16, and if the amplitude of the input voltage as applied to the terminals 14 and 14' increases, the magnetic core member 24 will saturate within a predetermined time interval which will be of shorter duration than in the case when the input voltage is of lesser amplitude. On the other hand, if the amplitude of the input voltage as applied to the terminals 14 and 14' decreases, the magnetic core member 24 will saturate within a longer time duration than in the case when the input voltage was of greater amplitude. Thus, the areas under the voltage-time curves for the reactor winding 26 are of substantially equal magnitude irrespective of the amplitude of the voltage across the terminals 14 and 14', since the same predetermined volt-seconds are required to saturate the magnetic core member 24 each time.

The apparatus embodying the teachings of this invention has several advantages. For instance, it comprises all static components which have an extremely long life, particularly when compared to electronic components. In addition, the reference device illustrated in Fig. 1 maintains to a relatively high degree of accuracy a substantially constant average output voltage irrespective of the amplitude of its input voltage. Further, the operation of the potential transformer 18 is not affected by having a D. C. component of current on the secondary side of the transformer 18. That is, since the transformer 18 is not a saturating transformer, such a D. C. component of current could not effect a saturation of the transformer 18. A D. C. component of current on the secondary side of the transformer 18 likewise cannot effect the operation of the saturating reactor 16, since it is conductively isolated from the secondary side of the transformer 18. A further advantage is that in many installations a potential transformer already exists and it is only necessary to add the saturating reactor 16 and the resistor 28 in order to obtain an effective voltage reference device as illustrated in Fig. 1.

Since numerous changes may be made in the above described apparatus and circuits, and different embodiments of the invention may be made without departing from the spirit and scope thereof, it is intended that all the matter contained in the foregoing description or shown in the accompanying drawing shall be interpreted as illustrative and not in a limiting sense.

We claim as our invention:

1. In a magnetic device for producing a substantially constant average output voltage even though the amplitude of its alternating current input voltage varies, the combination comprising, a transformer having a primary winding and a secondary winding, a saturating reactor including a magnetic core member and a reactor winding disposed in inductive relationship with the magnetic core member, an impedance in series with said reactor winding the reactor winding being connected to be energized in accordance with said input voltage, and circuit means for connecting the reactor winding in parallel circuit relationship with the primary winding of the transformer, whereby constant volt-seconds are applied to said transformer provided the said input voltage is of sufficient magnitude to effect a saturation of said magnetic core member each half-cycle of the said input voltage, to thereby produce a substantially constant average output voltage across the secondary winding of the said transformer.

2. In a magnetic device for producing a substantially constant average output voltage even though the amplitude of its alternating current input voltage varies, the combination comprising, a transformer having a primary winding and a secondary winding, a saturating reactor including a magnetic core member constructed of rectangular loop core material, and a reactor winding disposed in inductive relationship with the magnetic core member, an impedance member connected in series circuit relationship with the reactor winding, the series circuit being connected to be energized in accordance with said input voltage, and circuit means for connecting the reactor winding in parallel circuit relationship with the primary winding, whereby constant volt-seconds are applied to said transformer provided the said input voltage is of sufficient magnitude to effect a saturation of said magnetic core member each half-cycle of the said input voltage, to thereby produce a substantially constant average output voltage across the secondary winding of the said transformer.

References Cited in the file of this patent

UNITED STATES PATENTS

| | | |
|---|---|---|
| 1,180,800 | Taylor | Apr. 25, 1916 |
| 1,755,060 | Gay | Apr. 15, 1930 |
| 2,328,037 | Summers | Aug. 31, 1943 |